(12) United States Patent
Salter et al.

(10) Patent No.: US 10,926,815 B2
(45) Date of Patent: Feb. 23, 2021

(54) PICKUP TRUCK BOX DEFLECTOR

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Paul K. Dellock, Northville, MI (US); Aaron Halonen, Brighton, MI (US); Sashank Vuttaluru, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 130 days.

(21) Appl. No.: 16/402,291

(22) Filed: May 3, 2019

(65) Prior Publication Data

US 2020/0346698 A1    Nov. 5, 2020

(51) Int. Cl.
*B62D 35/00* (2006.01)
*B60R 13/04* (2006.01)
*B62D 33/027* (2006.01)
*B62D 33/03* (2006.01)

(52) U.S. Cl.
CPC ............ *B62D 35/007* (2013.01); *B60R 13/04* (2013.01); *B62D 33/027* (2013.01); *B62D 33/03* (2013.01); *B62D 35/00* (2013.01)

(58) Field of Classification Search
CPC .... B62D 35/007; B62D 33/027; B62D 33/03; B62D 35/00; B60R 13/04
USPC .............................................. 296/180.1, 57.1
See application file for complete search history.

(56) References Cited

U.S. PATENT DOCUMENTS

| 4,867,499 | A | 9/1989 | Stephan et al. |
| 5,149,164 | A | 9/1992 | Wilson |
| 5,340,184 | A | 8/1994 | Conrado |
| 5,664,822 | A | 9/1997 | Rosenfield |
| 6,749,245 | B1 * | 6/2004 | Walker ............... B62D 33/0273 296/57.1 |
| 7,293,821 | B2 | 11/2007 | Tran et al. |
| 9,016,764 | B2 | 4/2015 | Johnson et al. |
| 9,316,044 | B2 | 4/2016 | Hemphill |
| 9,527,535 | B1 | 12/2016 | Cha et al. |
| 9,701,266 | B2 | 7/2017 | Pena Casimiro et al. |
| 2001/0004155 | A1 * | 6/2001 | Decker ...................... B60J 5/12 296/57.1 |
| 2018/0178860 | A1 | 6/2018 | Kishima |

FOREIGN PATENT DOCUMENTS

DE          19625739 A1        1/1997

OTHER PUBLICATIONS https://tonneaucoversworld.com/p/access-trailseal-total-bed-seal/, Access TrailSeal Total Bed Seal.

* cited by examiner

*Primary Examiner* — Joseph D. Pape
*Assistant Examiner* — Dana D Ivey
(74) *Attorney, Agent, or Firm* — David Coppiellie; MacMillan, Sobanski & Todd, LLC

(57) ABSTRACT

A deflector mounts to a pickup truck. The deflector may include a mounting flange, mounted to and pivot with a bottom of a tailgate, and spaced from a rear bumper, and a louver extending downward from the mounting flange into a gap between the tailgate and the bumper, with the louver including a portion curving rearward as the louver extends downward such that air flow around the bumper from under the pickup truck is redirected upward along an outer panel of the tailgate.

14 Claims, 2 Drawing Sheets

PICKUP TRUCK BOX DEFLECTOR

BACKGROUND OF THE INVENTION

The present invention relates to a pickup truck and more particularly to a deflector mounted adjacent to a pickup truck box.

The boxes on the rear of pickup trucks are typically designed to allow for a gap between the sides of the box, at the D-pillar, the sill at the rear of the box floor and the tailgate. This arrangement allows for drainage of rain, snow and other fluids from the box while the tailgate is closed. When driving, though, the air pressure at the rear of the box allows some dirt, dust and moisture to enter the box through these gaps, particularly due to the stream of air flowing under the box being driven upwards against gravity by air pressure.

Additionally, many truck owners cover the box, for example, with a Tonneau cover, and as such consider the box more like a trunk that a pickup bed. For such truck owners, the dirt, dust and moisture in the box is even more undesirable.

A seal mounted in one of the gaps may reduce the entry of debris and moisture into the box due to this air pressure. However, pressure drops in the back of the box while driving the truck may strain such seals. This drawback is in addition to seal wear due to cargo loading, tailgate slams, box-to-tailgate movement, and weathering. And, the box still needs to have some sort of ability for drainage of fluids (rain, snow) from the box, which such a seal may interfere with.

Moreover, without a seal, the gap between the tailgate and bumper may create unsightly exposure of the floor sill and welds/rivets, which is not esthetically pleasing to truck owners.

SUMMARY OF THE INVENTION

An embodiment contemplates a deflector for a pickup truck that includes a mounting flange, configured to mount to and pivot with a bottom of a tailgate, and spaced from a rear bumper; and a louver configured to extend downward from the mounting flange into a gap between the tailgate and the bumper, the louver including a portion curving rearward as the louver extends downward, configured such that air flow around the bumper from under the pickup truck is redirected upward along an outer panel of the tailgate.

An embodiment contemplates a pickup truck including a rear bumper; a tailgate pivotable relative to the bumper; and a deflector including a mounting flange, mounted to and pivotable with a bottom of the tailgate, and spaced from the rear bumper; and a louver extending downward from the mounting flange into a gap between the tailgate and the bumper, the louver including a portion curving rearward as the louver extends downward such that air flow around the bumper from under the pickup truck is redirected upward along an outer panel of the tailgate.

An advantage of an embodiment is that the box deflector promotes an upward deflection of air recirculating from under the rear of the truck and also minimizes the gap between the tailgate and bumper to limit entry of debris and moisture into the box, while still allowing for fluids to drain from the box.

Another advantage of the invention is that the limiting of entry of debris and moisture into the box is accomplished while still allowing for the tailgate to pivot freely relative to the bumper (without resistance from a seal or other such member), thus assuring a long wear life.

Moreover, the box deflector may better hide the gap between the tailgate and bumper, thus providing a more esthetically pleasing look.

In addition, the box deflector may be mounted on a hem flange of the tailgate, which may allow for mounting without needing holes in the tailgate. This may also allow for the box deflector to act as a modular component that may be employed on various different tailgates having similar widths.

DETAILED DESCRIPTION

Figure 1:
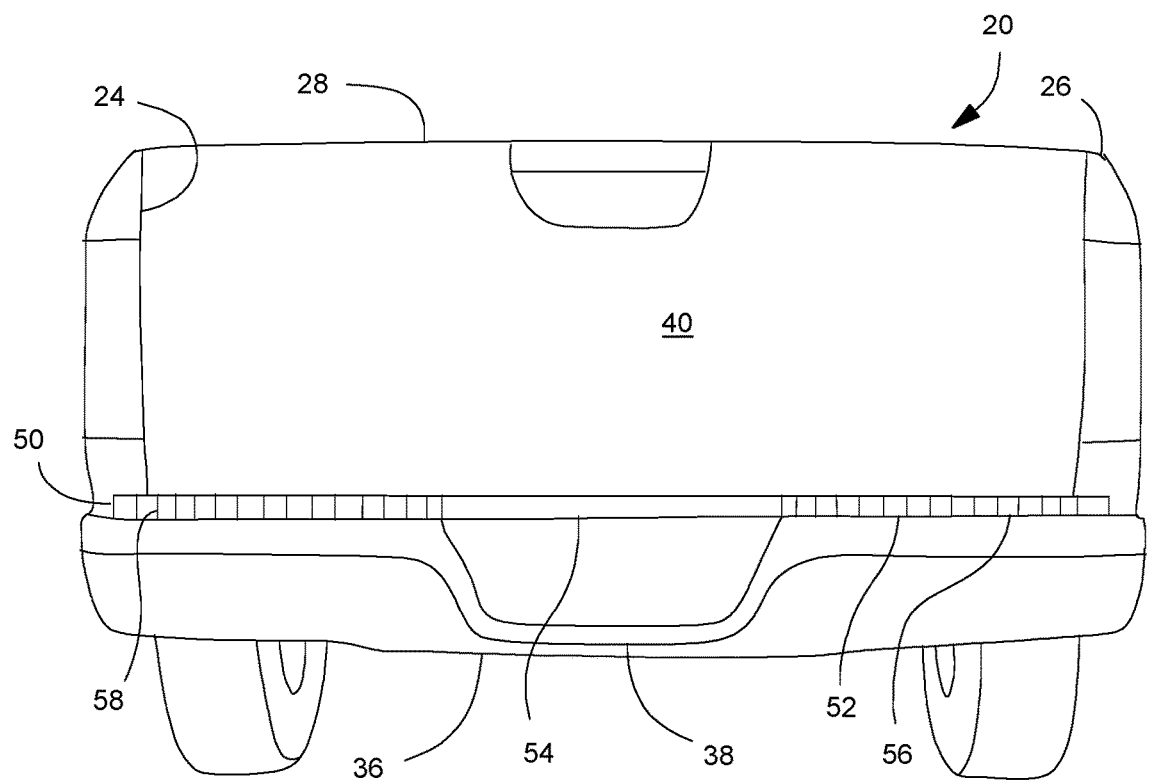
FIG. 1 is a schematic rear view of a pickup truck.
Figure 2:
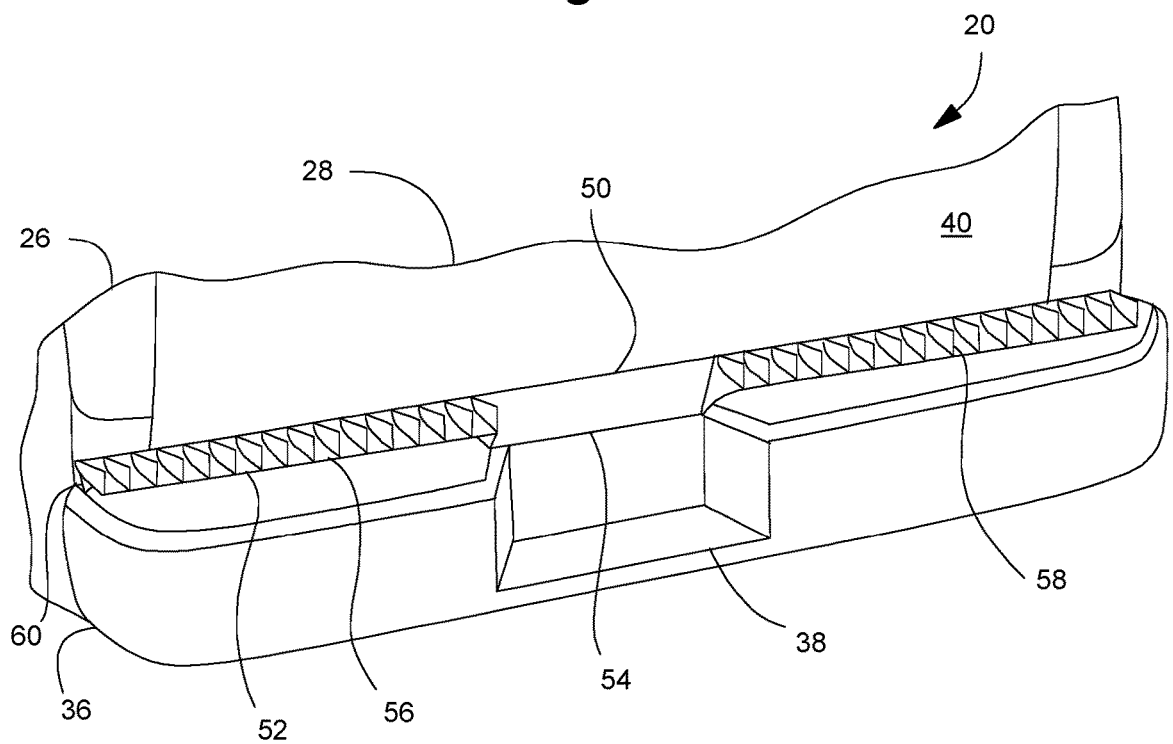
FIG. 2 is a schematic perspective view of a rear portion of a pickup truck.

FIGS. 1-4 illustrate a pickup truck 20 having a box 22 at its rear, with the box 22 defined by a pair of longitudinally extending sides 24 having D-pillars 26 at rear ends, an openable tailgate 28 extending between the D-pillars 26, and a floor 30 extending rearward to a floor sill 32 adjacent to the tailgate 28. A gap 34 exists between the rear of the floor 30 and the tailgate 28 to allow for fluid drainage from the box 22. A rear bumper 36 extends laterally across the truck 20, adjacent to and below the tailgate 28. The tailgate 28 may have a center cutout (recesses) portion 38 that may be employed, for example, for mounting a license plate or attaching a trailer hitch. The tailgate 28 may include an outer (rear) panel 40 and an inner panel 42, secured at bottom ends to form a hem flange 44. Another gap 46 exists between the hem flange 44 of the tailgate 28 and the top of the bumper 36, which allows fluids that drain through the gap between the floor 30 and tailgate 28 to also flow out between the tailgate 28 and bumper 36. Thus, fluids can drain from the box 22 to outside of the truck 20. The description of the pickup truck 20 up to this point may be conventional, if so desired, and so will not be discussed further herein.

A deflector 50 mounts to the bottom of the tailgate 28 and extends downward into the gap 46 between the tailgate 28 and bumper 36, significantly reducing any effective gap between the tailgate 28 and bumper 36 through which air flowing from under the truck 20 can flow into the box 22. Limiting this air flow into the box 22 limits flow of debris and moisture into the box 22 through the gaps 34, 46.

Figure 3:
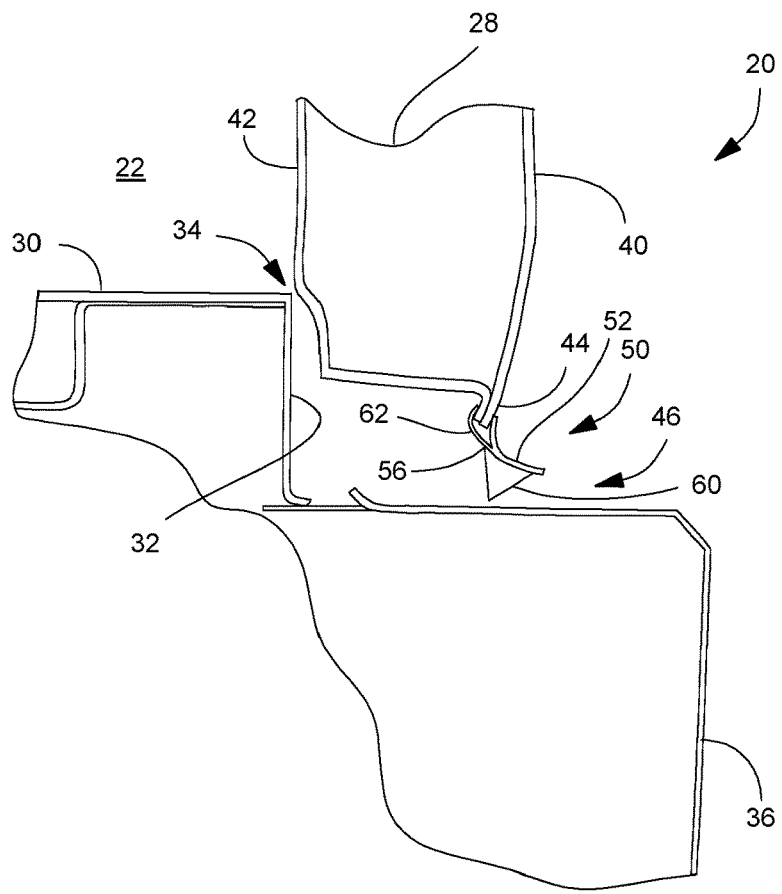
FIG. 3 is a schematic section view through a portion of a rear bumper, tailgate and box floor of the pickup truck.
Figure 4:
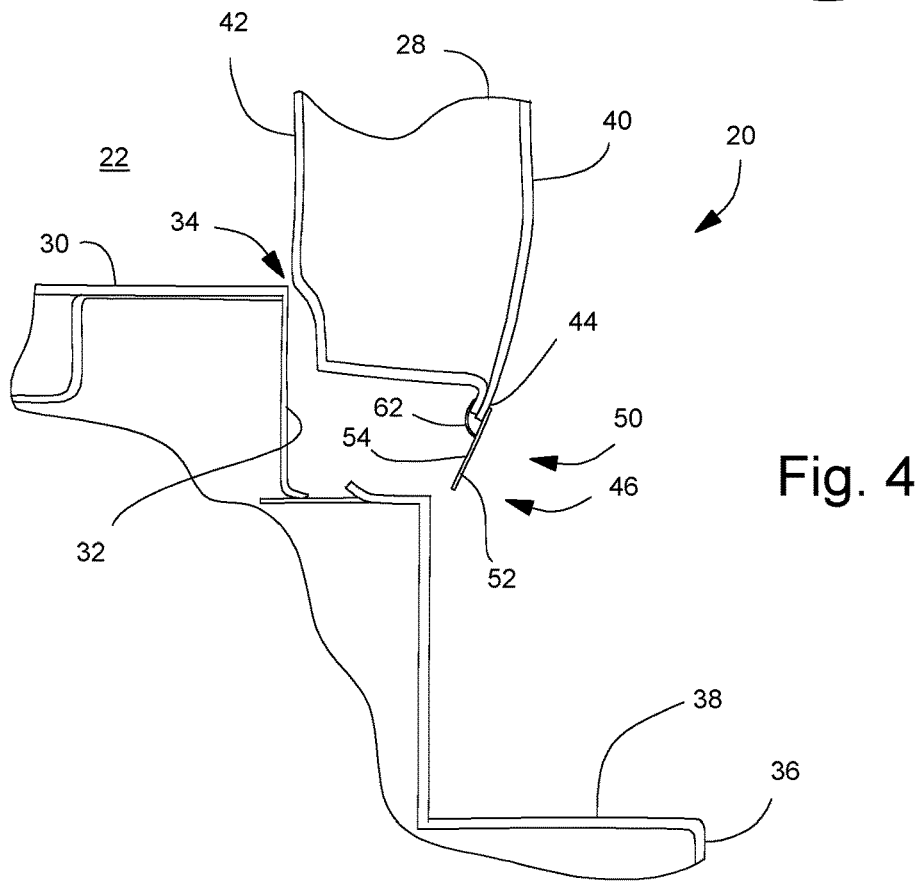
FIG. 4 is a schematic view similar to FIG. 3, but taken through the center (license plate area) of the bumper.

The deflector 50 includes a laterally extending louver 52, which extends the width of the tailgate 28 and preferably laterally beyond each side of the tailgate 28 so that the louver 52 extends under at least a portion of each D-pillar 26. The louver 52 is generally defined by three portions, a center portion 54 that extends laterally across the center cutout 38 of the bumper 36, and a pair of side portions 56 that extend outward laterally from the center portion 54 to the D-pillars 26. The cross sectional shape of the center portion 54 of the louver 52 is best seen in FIG. 4, where the center portion 54 angles downward and forward across the gap 46. This shape tends to keep the center portion 54 out of the way of the center cutout 38, where mounting license plates or trailer hitches may occur. The side portions 56 of the louver 52 are best seen in FIG. 3, where they extend downward while curving rearward. This curvature of the side portions 56 helps to direct air (flowing up and around the bumper 36 from under the truck 20 while the vehicle is driving forward) upward along the outer panel 40 of the tailgate 28 rather than into the remaining small portion of the gap 46 between the deflector 50 and bumper 36.

The deflector 50 also includes spaced apart outer support fins 58 (see in particular FIG. 2) that extend longitudinally outward (rearward) from the side portions 56 of the louver 52. These fins 58 provide rigidity for the louver 52 as well as helping to direct the air flow upward. Inner support fins 60 extend forward from the louver 52 and also provide rigidity to the louver 52.

A mounting flange 62 of the deflector 50 extends upward from the louver 52 and surrounds (i.e., front and back) the hem flange 44 of the tailgate 28. The mounting flange 62 may use, for example, an elastic bias (like a spring), sealant, and/or adhesive to secure the mounting flange 62 to the tailgate 28. Thus, the deflector 50 is securely mounted to the tailgate 28 while not interfering with the pivoting of the tailgate 28 relative to the bumper 36 or floor 30 (i.e., swing clearance). This allows for a long wear life for the deflector 50.

While certain embodiments of the present invention have been described in detail, those familiar with the art to which this invention relates will recognize various alternative designs and embodiments for practicing the invention as defined by the following claims.

The invention claimed is:

1. A deflector for a pickup truck comprising:
    a mounting flange, configured to mount to and pivot with a bottom of a tailgate, and spaced from a rear bumper; and
    a louver configured to extend downward from the mounting flange into a gap between the tailgate and the bumper, the louver including a portion curving rearward as the louver extends downward, configured such that air flow around the bumper from under the pickup truck is redirected upward along an outer panel of the tailgate; and
    spaced apart outer support fins extending longitudinally rearward from the louver portion that curves rearward as the louver extends downward.

2. The deflector of claim 1 wherein the mounting flange is configured to be secured to a hem flange of the tailgate.

3. The deflector of claim 1 wherein the louver is configured to extend laterally under at least an entire width of tailgate.

4. The deflector of claim 3 wherein the louver is configured to extend laterally beyond the tailgate to under at least a portion of D-pillars.

5. The deflector of claim 1 wherein the louver includes:
    a center portion, configured to align with a center bumper cutout portion and extend forward as the center portion extends downward from the tailgate; and
    a second rearward curving portion, on an opposite side of the center portion from the rearward curving portion, the second rearward curving portion curving rearward as the louver extends downward.

6. The deflector of claim 1 including spaced apart inner support fins extending longitudinally forward from the louver portion.

7. The deflector of claim 1 wherein the deflector is configured to mount to the tailgate such that the deflector has no contact with a box floor for all positions of the tailgate.

8. A pickup truck comprising:
    a rear bumper;
    a tailgate pivotable relative to the bumper; and
    a deflector including a mounting flange, mounted to and pivotable with a bottom of the tailgate, and spaced from the rear bumper; and a louver extending downward from the mounting flange into a gap between the tailgate and the bumper, the louver including a portion curving rearward as the louver extends downward such that air flow around the bumper from under the pickup truck is redirected upward along an outer panel of the tailgate; and wherein the louver extends laterally beyond the tailgate to under at least a portion of D-pillars.

9. The deflector of claim 8 wherein the mounting flange is secured to a hem flange of the tailgate.

10. The deflector of claim 8 including spaced apart outer support fins extending longitudinally rearward from the louver portion that curves rearward as the louver extends downward.

11. The deflector of claim 8 wherein the louver includes:
    a center portion, configured to align with a center bumper cutout portion and extend forward as the center portion extends downward from the tailgate; and
    a second rearward curving portion, on an opposite side of the center portion from the rearward curving portion, the second rearward curving portion curving rearward as the louver extends downward.

12. The deflector of claim 8 including spaced apart inner support fins extending longitudinally forward from the louver portion.

13. The deflector of claim 8 wherein the deflector mounts to the tailgate such that the deflector has no contact with a box floor for all positions of the tailgate.

14. A deflector for a pickup truck comprising:
    a mounting flange, configured to mount to and pivot with a bottom of a tailgate, and spaced from a rear bumper; and
    a louver configured to extend downward from the mounting flange into a gap between the tailgate and the bumper, the louver including a portion curving rearward as the louver extends downward, configured such that air flow around the bumper from under the pickup truck is redirected upward along an outer panel of the tailgate; and wherein the louver includes a center portion, configured to align with a center bumper cutout portion and extend forward as the center portion extends downward from the tailgate; and a second rearward curving portion, on an opposite side of the center portion from the rearward curving portion, the second rearward curving portion curving rearward as the louver extends downward.

* * * * *